United States Patent [19]

Svengren et al.

[11] Patent Number: 4,917,590
[45] Date of Patent: Apr. 17, 1990

[54] APPARATUS FOR PREPARING ROLLED PASTRY PRODUCTS

[75] Inventors: Anders G. Svengren, Hjaernarp; Lars G. A. Wadell, Aastorp, both of Sweden

[73] Assignee: Nestec S.A., Vevey, Switzerland

[21] Appl. No.: 311,622

[22] Filed: Feb. 15, 1989

Related U.S. Application Data

[62] Division of Ser. No. 15,933, Feb. 18, 1987, Pat. No. 4,828,862.

[30] Foreign Application Priority Data

Mar. 24, 1986 [EP] European Pat. Off. ........... 86104045

[51] Int. Cl.$^4$ .......................... B29C 53/00; A21C 3/06
[52] U.S. Cl. .................................... 425/321; 425/329; 425/367; 425/373; 426/501
[58] Field of Search ............... 425/321, 329, 363, 367, 425/373; 426/500, 501

[56] References Cited

U.S. PATENT DOCUMENTS

| | | | |
|---|---|---|---|
| 1,206,069 | 11/1916 | Werner | 425/363 |
| 1,519,569 | 12/1924 | Vicars | 425/367 |
| 2,478,885 | 8/1949 | Alvey | 425/301 |
| 3,225,717 | 12/1965 | Page | 426/501 |
| 3,342,144 | 9/1967 | Pilliner | 426/501 |
| 4,110,482 | 8/1978 | Sato | 426/502 |
| 4,517,785 | 5/1985 | Masuda | 99/450.6 |
| 4,600,595 | 7/1986 | Svengren et al. | 426/501 |
| 4,640,670 | 2/1987 | Svengren et al. | 425/142 |

FOREIGN PATENT DOCUMENTS

| | | |
|---|---|---|
| 520213 | 3/1931 | Fed. Rep. of Germany . |
| 2428403 | 1/1980 | France . |
| 218395 | 7/1924 | United Kingdom . |

*Primary Examiner*—Jay H. Woo
*Assistant Examiner*—C. Scott Bushey
*Attorney, Agent, or Firm*—Vogt & O'Donnell

[57] ABSTRACT

An apparatus for preparing rolled pieces of pastry includes at least four adjacent rollers having parallel axes, being capable of defining a substantially cylindrical cavity, being adapted to rotate in the same direction and being adapted to rotate at a same peripheral speed. Means are provided for forming and then closing an admitting gap between two of the rollers for admitting pieces to be rolled into the cavity for rolling. Means are provided also for forming a releasing gap between two of the rollers for releasing rolled pieces from the cavity.

8 Claims, 1 Drawing Sheet

APPARATUS FOR PREPARING ROLLED PASTRY PRODUCTS

CROSS REFERENCE TO RELATED APPLICATION

This is a divisional of application Ser. No. 07/015,933 filed Feb. 18, 1987, now U.S. Pat. No. 4,828,862.

BACKGROUND OF THE INVENTIONS

The present invention relates to rolling pastry products, especially for rolling sheets of partially folded pastry material advancing on a conveyor belt.

In the preparation of rolled pastry products on a conveyor belt, such as pancakes or Swiss rolls, three distinct operations are required:

(1) distributing or dividing the pastry into discrete pieces of a predetermined size e.g., by means of a cutting mechanism or a dispenser;

(2) lifting up at least one edge to form a partially folded product; and (3) rolling the folded product.

Each of these three operations is carried out in a separate step and the rolling may be done either by hand or by using complex devices which are not easy to maintain or clean.

Hand rolling is labour intensive and it is desirable not only to reduce labour costs but also to ensure that the products are untouched by hand. In addition, it would be desirable to devise an automatic rolling system which is simpler than those heretofore known.

We have now developed such a system using at least four parallel rollers which are positioned to define a cavity the dimensions of which are equivalent to the desired diameter of the final product.

DESCRIPTION OF THE INVENTIONS

As disclosed and claimed in our co-pending application Ser. No. 07/015,933, now U.S. Pat. No. 4,828,862 the invention provides a method of rolling sheets of partially folded pastry material advancing on a conveyor belt characterised in that the partially folded pastry material is transferred from the leading edge of the conveyor belt and admitted into a roughly cylindrical cavity having a diameter equivalent to the desired diameter of the final product and enclosed by at least four rollers positioned adjacent to the leading edge of the conveyor belt, whose longitudinal axes are parallel and extend transversely to the direction of movement of the belt, all the rollers rotating in the same direction at a speed suitable for rolling the pastry material, after which the rolled product is released from the cavity.

In this invention, the partially folded pastry product is formed by lifting up the leading edge of the pastry material, which extends transversely across the conveyor belt as the pastry material is transported. One example of forming the partially folded pastry material is described and claimed in our EP-A-160116 and in its counterpart U.S. applications, now U.S. Pat. Nos. 4,600,595 and 4,640,670.

As the pastry material is transferred from the conveyor belt to the cavity, it is conveniently picked up by and transported over the upper peripheral surface of a first roller mounted so that its upper peripheral surface is substantially level with and just beyond the leading edge of the conveyor belt carrying the pastry material. Preferably, at least during the initial period of transfer of the pastry material from the leading edge of the conveyor belt to the cavity, the peripheral speed of the rollers is approximately the same as the speed of the conveyor belt transporting the pastry material. This ensures a smooth transfer without damaging or tearing the pastry material before the peripheral speed of the rollers is increased to a speed suitable for rolling. A suitable speed for rolling may be from 5 RPM to 300 RPM, preferably from 10 RPM to 200 RPM. Usually, it is necessary for at least half and, more often, at least three quarters of the partially folded pastry material to have left the conveyor belt before the high speed rolling commences, in order to avoid splitting or tearing of the pastry material which could be caused by transfer from a relatively slowly moving conveyor belt to a relatively high speed roller.

The pastry material is advantageously admitted to the cavity by passing transversely through a temporary gap formed between two adjacent rollers, for example, by the oscillation of one or both rollers so that lateral separation occurs first to form the gap through which the pastry material is admitted followed by return to the original position to enclose the pastry material in the cavity. Preferably, the temporary gap is formed between the upper peripheral surface of the first roller and an adjacent roller, for instance, by the oscillation of the adjacent roller which first ascends to form the gap and then descends to its original position. After being rolled, the pastry product may be released from the cavity also by passing transversely through a temporary gap formed between two adjacent rollers by the oscillation of one or both rollers as described above. This gap may conveniently be formed between the first roller and another adjacent roller.

The diameter of the cavity may be adjusted to the desired dimensions by adjusting the rollers.

After being released, the rolled pastry product may fall directly onto an open-topped container by the process described and claimed in our European Patent Application No. 86101321.7 and in its counterpart U.S. application, now U.S. Pat. No. 4,650,315, whereby the container-carrying conveyor passes beneath the gap between the rollers through which the product is released preferably so that the upper edge of the container is from 3 to 15 mm below the peripheral surface of the lowest roller of the pair which form the gap through which the rolled pastry product is released. The conveyor transporting the open-topped containers is inclined downwards, at least at a position beneath the temporary gap, in its direction of travel at an acute angle of less than 60° to the horizontal and also travels discontinuously so that when a container is positioned at successive stopping positions beneath the temporary gap, the rolled pastry products fall through the gap consecutively into the container until the container is filled with the food products in a compact row.

The present invention also provides an apparatus for rolling sheets of partially folded pastry material comprising a conveyor belt for transporting the partially folded pastry material, at least four rollers positioned adjacent to the leading edge of the conveyor belt, whose longitudinal axes are parallel and extend transversely to the direction of movement of the belt so that in cross-sectional outline the internal surfaces of the rollers define and enclose a roughly cylindrical cavity having a diameter equivalent to the desired diameter of the final rolled product, the rollers being adapted to rotate in the same direction at a speed suitable for rolling the pastry material, and means for admitting the partially folded pastry material to the cavity and for releasing the rolled product from the cavity.

Advantageously, means are provided for adjusting the position of at least some of the rollers in order to adjust the diameter of the cavity to the desired dimensions.

Preferably, a first roller is mounted so that its upper peripheral surface is level with and just beyond the leading edge of the conveyor belt carrying the pastry material. This roller is advantageously fixed in this position.

The means for admitting the pastry material to the cavity may be provided by the oscillation of one or two adjacent rollers, for example, the roller adjacent to the upper peripheral surface of the first roller ascends to form a temporary gap between the two rollers through which the pastry material may pass transversely and then descends to enclose the pastry material within the cavity.

The means for releasing the rolled pastry product from the cavity may also be provided by the oscillation of one or two adjacent rollers whereby two rollers separate to form a gap through which the pastry product may pass transversely after which the rollers return to their original position.

The method and apparatus of the present invention are particularly suitable for rolling pastry materials such as crepes, pancakes and Swiss rolls.

The method may be carried out continuously and automatically and all the movements may be synchronised by conventional means so that large numbers of rolled pastry products may be produced and packaged on a production line.

BRIEF DESCRIPTION OF THE DRAWING

The present invention will now be further illustrated by way of example with reference to the following drawing.

DETAILED DESCRIPTION OF THE DRAWING

Figure 1:
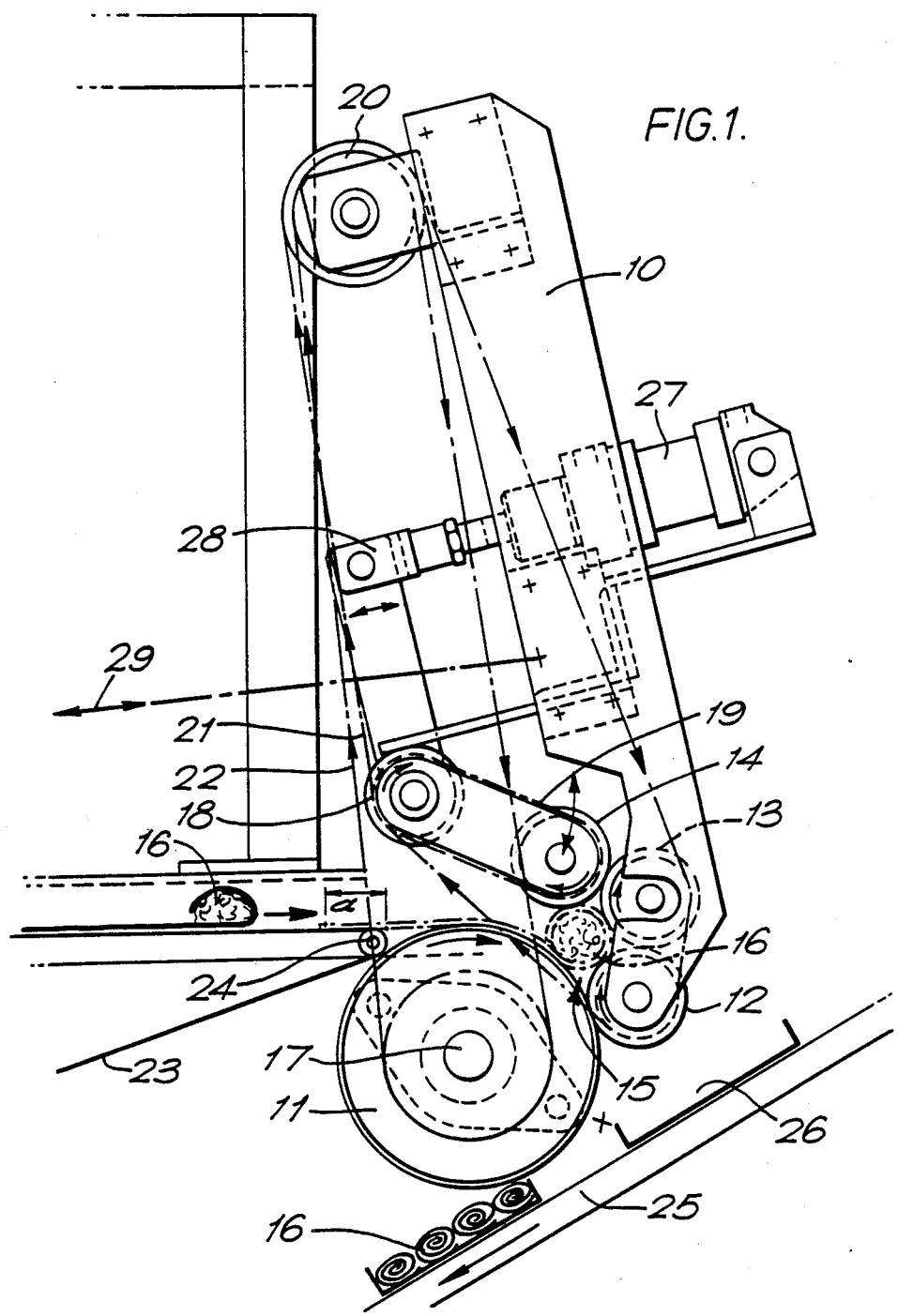
FIG. 1 represents a diagrammatic sectional side view of the apparatus.

Referring to FIG. 1, the apparatus consists essentially of a pivoted arm 10 and four rollers, 11, 12, 13 and 14 enclosing a cavity 15 enclosed in which is a crepe 16. Roller 11 is fixed by its axle 17 to the frame (not shown) while roller 14 can oscillate up and down as indicated by the arrow. Roller 14 is driven by a sprocket 18 by means of a chain 19, while rollers 12, 13 (which are fixed to the arm 10) and sprocket 18 are connected to a sprocket 20 by means of a chain 21. Roller 11 is the drive roller and is connected to sprocket 20 by means of an endless belt 22. The chains and rollers travel in the direction indicated by the arrows. A conveyor belt 23 with a leading edge trained around roller 24 transports a crepe 16 and a conveyor belt 25 transports open-topped containers 26. The ascent and descent of roller 14 is effected by means of a pneumatic cylinder 27 and a lever 28 while the pivoting of the arm 10 to the right and to the left as indicated by the arrow 29 is also effected by means of a pneumatic cylinder (not shown).

In operation, the partially folded crepe 16 is transported on the conveyor belt 23 and trvels over the leading edge where it is transferred on to the upper peripheral surface of the roller 11 which together with all the other rollers, travels at 20 RPM, the same speed as the conveyor belt 23. As soon as the length of the crepe remaining on the conveyor belt 23 is less than the distance "a" (approximately 30 mm) a photocell (not shown) is activated whereupon the motor of drive roller 11 increases the speed of the rollers to 160 RPM which causes the rest of the crepe to pass over the leading edge of the conveyor belt 23 and enter the cavity 15 through the gap between roller 11 and roller 14 which is formed by roller 14 ascending. After the crepe has entered the cavity, roller 14 descends to enclose the crepe for rolling. The ascent and descent of roller 14 is achieved at the appropriate time by activation of an electrical sensor (not shown). After 1 second, the rolling is completed and the arm 10, activated by an electrical sensor (not shown) pivots to the right as seen in FIG. 1 while simultaneously roller 14 ascends. Since roller 12 is fixed to the arm 10, a gap is formed between rollers 11 and 12 through which the rolled crepe 16 falls into the container 26 travelling on conveyor belt 25. Immediately after the rolled crepe has been released from the cavity, the speed of the rollers is adjusted to the speed of the conveyor belt 23 and the arm 10 pivots to the left as seen in FIG. 1 so that the roller 12 returns to its original position to close the cavity 15 which is then ready to receive another partially folded crepe 16 through the gap between roller 11 and roller 14. The conveyor belt 25 is adapted to stop intermittently so that an empty container 26 passing beneath the gap between rollers 11 and 12 stops initially at a position where its front wall is substantially below the peripheral surface of roller 11 bounding the gap at position X, to enable a food product to fall into the container and abut against its front wall. Thereafter, the container intermittently travels a distance corresponding to the width of one food product and stops to allow further food products to fall into the container, each further food product abutting against the immediately preceding one until the container is full.

In an advantageous modification, the roller 11 is reduced to about half the size indicated in the drawing. This modification enables the cavity 15 in which the crepe is rolled to be positioned closer to the conveyor belt 25 and thus the crepe has less distance to fall which means that there is less risk of damage to the rolled crepe and less risk of the rolled crepe opening up. In addition, the crepes can be rolled smaller and tighter.

We claim:

1. An apparatus for preparing rolled pieces of pastry material comprising:
   at least four rollers rotatable in a same direction at a same peripheral speed positioned for having parallel longitudinal axes and for defining a substantially cylindrical cavity enclosed by the rollers;
   a conveyor belt having a leading edge positioned adjacent the rollers and a surface for transporting pieces of pastry to be rolled to the rollers in a direction transverse to the longitudinal axes of the rollers;
   means for forming an admitting gap between two of the rollers for admitting pieces of pastry material to be rolled from the conveyor belt through the admitting gap into the cavity and then for closing the admitting gap between the two admitting rollers for then rolling the pieces in the cavity with each roller; and
   means for forming a releasing gap between two of the rollers for releasing rolled pieces from the cavity from between the two releasing rollers forming the releasing gap and for closing the releasing gap.

2. An apparatus according to claim 1 wherein the means for forming and for closing the admitting gap comprises means for oscillating at least one roller for forming and for closing the admitting gap.

3. An apparatus according to claim 1 wherein the means for forming the releasing gap comprises means for oscillating at least one roller for forming and for closing the releasing gap.

4. An apparatus according to claim 1 wherein one admitting roller is positioned such that its upper peripheral surface is level with the conveyor belt surface transporting the pieces to be rolled and below the other admitting roller.

5. An apparatus according to claim 1 wherein one admitting roller is in a fixed position relative to the conveyor belt such that its upper peripheral surface is level with the conveyor belt surface transporting the pieces to be rolled and the means for forming and closing the admitting gap comprises means for oscillating a roller above the upper peripheral surface of the fixed position roller for forming and closing the admitting gap.

6. An apparatus according to claim 1 further comprising means for adjusting the position of the rollers for adjusting the diameter of the cavity.

7. An apparatus according to claim 1 further comprising a second conveyor belt for transporting open-ended containers adjacent the releasing rollers for receiving rolled pieces released from the cavity via the releasing gap.

8. An apparatus according to claim 7 wherein the second conveyor belt is inclined downwards at an acute angle of less than 60° to the horizontal for receiving the rolled pieces.

* * * * *

UNITED STATES PATENT AND TRADEMARK OFFICE
CERTIFICATE OF CORRECTION

PATENT NO. : 4,917,590

DATED : April 17, 1990

INVENTOR(S) : Anders G. SVENGREN, et al.

It is certified that error appears in the above-identified patent and that said Letters Patent is hereby corrected as shown below:

On the title page, under the heading "inventors," "Hjaernarp" should read --S-Hjaernarp-- and "Aastorp" should read --S-Aastorp--.

Column 5, line 6, (line 2 of claim 3) after "forming" insert --and for closing--.

Signed and Sealed this

Twenty-sixth Day of March, 1991

Attest:

HARRY F. MANBECK, JR.

Attesting Officer

Commissioner of Patents and Trademarks